(12) United States Patent
O'Rorke et al.

(10) Patent No.: US 12,146,478 B2
(45) Date of Patent: Nov. 19, 2024

(54) DUAL PUMP FUEL SYSTEMS

(71) Applicant: Hamilton Sundstrand Corporation, Charlotte, NC (US)

(72) Inventors: Morgan O'Rorke, West Hartford, CT (US); Ryan Susca, Windsor, CT (US); Ryan Shook, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 107 days.

(21) Appl. No.: 17/825,859

(22) Filed: May 26, 2022

(65) Prior Publication Data

US 2023/0383736 A1 Nov. 30, 2023

(51) Int. Cl.
| | |
|---|---|
| *F04B 23/04* | (2006.01) |
| *F04B 49/22* | (2006.01) |
| *F23R 3/28* | (2006.01) |
| *F02C 7/22* | (2006.01) |

(52) U.S. Cl.
CPC ............ *F04B 23/04* (2013.01); *F04B 49/225* (2013.01); *F02C 7/22* (2013.01); *F23R 3/28* (2013.01)

(58) Field of Classification Search
CPC .......... F04B 23/04; F04B 49/225; F02C 7/22; F02C 7/236; F02C 9/263; F23R 3/28
See application file for complete search history.

(56) References Cited

U.S. PATENT DOCUMENTS

| | | | | |
|---|---|---|---|---|
| 5,118,258 A | * | 6/1992 | Martin ..................... | F02C 7/236 60/734 |
| 7,845,177 B2 | | 12/2010 | Parsons | |
| 8,172,551 B2 | * | 5/2012 | Baker ...................... | F02C 7/236 417/213 |
| 8,302,406 B2 | * | 11/2012 | Baker ....................... | F02C 9/36 60/734 |
| 8,408,233 B2 | | 4/2013 | Reuter et al. | |
| 8,596,993 B2 | * | 12/2013 | Kleckler ................. | F02C 7/236 137/115.23 |
| 8,834,134 B2 | | 9/2014 | Baker et al. | |

(Continued)

FOREIGN PATENT DOCUMENTS

WO 2007044020 A2 4/2007

OTHER PUBLICATIONS

Extended European Search Report issued in Application No. 23175680.0 dated Oct. 10, 2023.

*Primary Examiner* — Charles G Freay
*Assistant Examiner* — Benjamin Doyle
(74) *Attorney, Agent, or Firm* — Kinney & Lange, P.A.

(57) ABSTRACT

A fuel pump system includes a main fuel pump between a system fuel inlet and a system fuel outlet, a fuel flow path at least partially defined between the main fuel pump and the system fuel outlet, and a support fuel pump between the system fuel inlet and the system fuel outlet. The support fuel pump is sized to provide more flow to the system fuel outlet, when in an active state, than the main fuel pump. The system includes a valve assembly in fluid communication with the support fuel pump configured and adapted to connect the support fuel pump to the system fuel outlet, and a pressure regulating valve in fluid communication with the fuel flow path between the main fuel pump and the system fuel outlet. The system includes an EHSV in fluid communication with the fuel flow path between the PRV and the system fuel outlet.

20 Claims, 6 Drawing Sheets

(56) References Cited

U.S. PATENT DOCUMENTS

| | | | |
|---|---|---|---|
| 8,893,466 B2* | 11/2014 | Reuter | F02C 9/263 60/734 |
| 9,140,191 B2* | 9/2015 | Haugsjaahabink | F02C 7/22 |
| 9,353,688 B2* | 5/2016 | Futa | F02C 7/22 |
| 9,500,135 B2* | 11/2016 | Bader | F02C 7/236 |
| 9,702,301 B2* | 7/2017 | Potel | F02C 7/22 |
| 10,502,138 B2* | 12/2019 | Reuter | F02C 9/263 |
| 2010/0089026 A1* | 4/2010 | Baker | F02C 9/30 137/565.29 |
| 2012/0045348 A1* | 2/2012 | Garry | F04B 23/04 417/302 |
| 2012/0156061 A1* | 6/2012 | Baker | F02C 7/236 417/288 |
| 2013/0061932 A1* | 3/2013 | Rosner | F15B 11/17 137/1 |

* cited by examiner

DUAL PUMP FUEL SYSTEMS

BACKGROUND OF THE INVENTION

1. Field of the Invention

The present disclosure relates to dual pump fuel systems and more particularly to valve assemblies for dual pump fuel systems.

2. Description of Related Art

Modern turbine engines are constantly attempting to reduce parasitic draw from control components to improve Thrust Specific Fuel Consumption (TSFC), while balancing cost, weight and reliability. Fuel pump systems generally include a single positive displacement pump, where the single pump is sized to provide the desired fuel flow under a variety of conditions, e.g. take-off and cruise. That single pump is sized to provide flow on-demand for large transient or short-term high-power conditions, which can be inefficient when most of the time the system is at cruise, which tends to be longer in duration but with a much lower flow demand than a higher-power condition.

The conventional techniques have been considered satisfactory for their intended purpose. However, there is a need for improved fuel pump systems. This disclosure provides a solution for this need.

SUMMARY OF THE INVENTION

A fuel pump system includes a main fuel pump between a system fuel inlet and a system fuel outlet. The system includes a fuel flow path at least partially defined between the main fuel pump and the system fuel outlet. The system includes a support fuel pump between the system fuel inlet and the system fuel outlet. The support fuel pump is sized to provide more flow to the system fuel outlet, when in an active state, than the main fuel pump. The system includes a valve assembly in fluid communication with the support fuel pump configured and adapted to connect the support fuel pump to the system fuel outlet. The system includes a pressure regulating valve (PRV) in fluid communication with the fuel flow path between the main fuel pump and the system fuel outlet. The system includes an electro-hydraulic servo valve (EHSV) in fluid communication with the fuel flow path between the PRV and the system fuel outlet.

In some embodiments, the valve assembly includes a pressure bypass valve (PBV) in fluid communication with the fuel flow path, between the support fuel pump and the system fuel outlet. The system can include a solenoid valve in fluid communication with the PBV. The PBV can be configured and adapted to translate between an open position and a closed position. In the open position, fluid flow can be permitted between the support fuel pump and the system fuel outlet.

In some embodiments, the valve assembly includes a second PRV in fluid communication with the support fuel pump. The PRV can be positioned between an upstream side and a downstream side of the support fuel pump. The valve assembly can include a solenoid valve in fluid communication with the upstream side of the support fuel pump and the downstream side of the support fuel pump. The valve assembly can include a second EHSV in fluid communication with the support fuel pump between the support fuel pump and The fuel pump system fuel outlet.

In some embodiments, the system includes a shut-off valve (SOV) in fluid communication with the support fuel pump between the support fuel pump and the system fuel outlet. The SOV can be configured and adapted to translate between and open position and a closed position. In the open position, fluid flow can be permitted between the support fuel pump and the system fuel outlet. The main fuel pump and the support fuel pump can be fixed displacement, positive displacement pumps.

In accordance with another aspect, a method for controlling a dual fuel pump system includes pumping fuel from a system fuel inlet to a system fuel outlet with a main fuel pump. The method includes at least one of connecting or disconnecting a support fuel pump with a valve assembly. The method includes pumping fuel from the system fuel inlet to the system fuel outlet with a support fuel pump. The support fuel pump is sized to provide more flow to the system fuel outlet than the main fuel pump.

The method can include switching at least one of the solenoid or the EHSV to a closed position to close the valve assembly to place the support fuel pump in an idle state. The valve assembly can include at least one of the PRV, the PBV, or the SOV to place the support fuel pump in an idle state. The method can include switching the EHSV to a closed position to close at least one of the PRV, the PBV, or the SOV to place the support fuel pump in an idle state.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
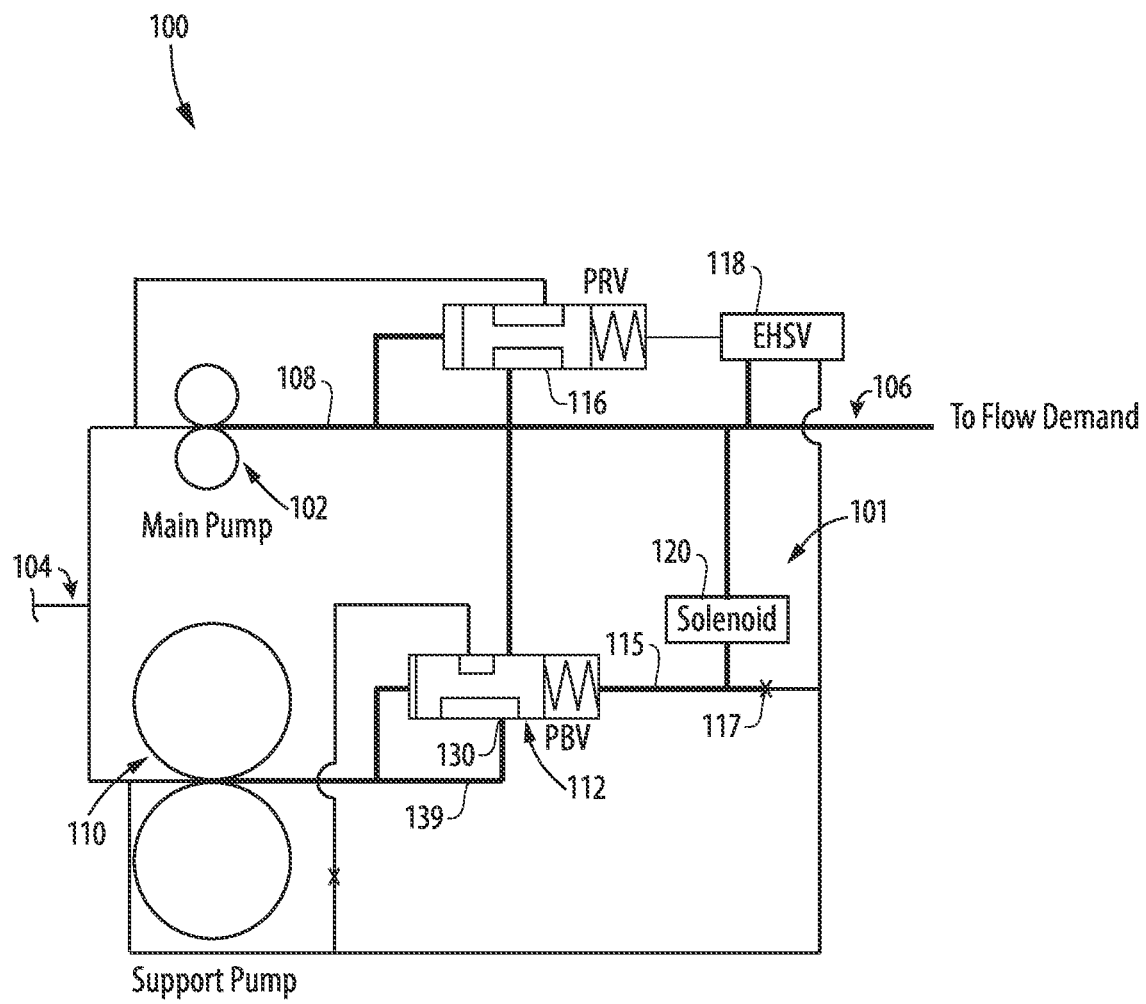
FIG. 1 is a schematic depiction of a fuel pump system constructed in accordance with an embodiment of the present disclosure, showing the PBV in a closed position.

Reference will now be made to the drawings wherein like reference numerals identify similar structural features or aspects of the subject disclosure. For purposes of explanation and illustration, and not limitation, a schematic view of an exemplary embodiment of the fuel pump system in accordance with the disclosure is shown in FIG. 1 and is designated generally by reference character 100. Other embodiments of the fuel pump systems in accordance with the disclosure, or aspects thereof, are provided in FIGS. 2-6 as will be described. The systems and methods described herein use dual positive displacement pumps in an "on demand" configuration where the second pump (the support pump) can be put into an idle mode to reduce pump horsepower at critical operating conditions.

Figure 2:
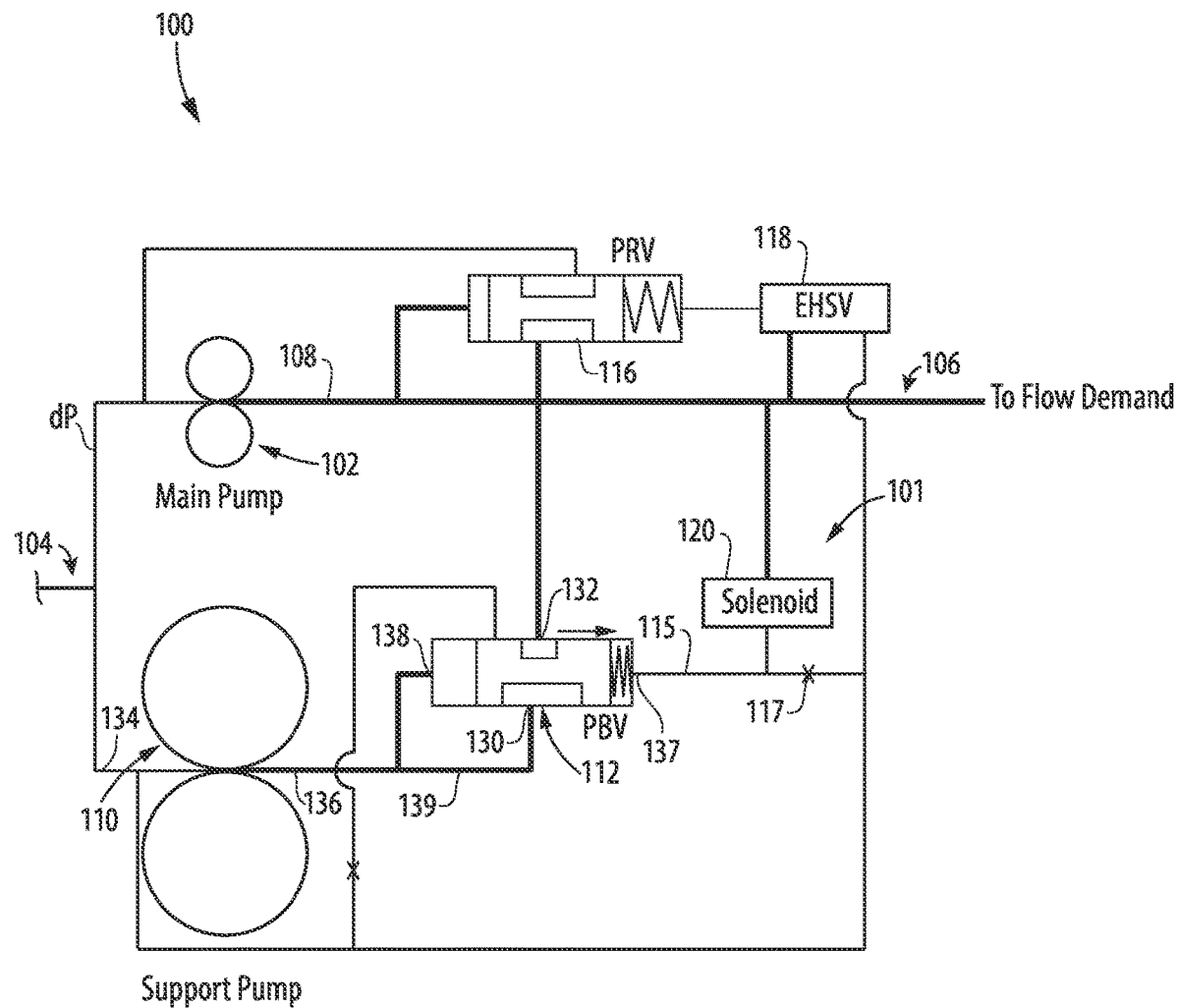
FIG. 2 is a schematic depiction of the system of FIG. 1, showing the PBV in an open position.

As shown in FIGS. 1-2, fuel pump system 100 includes two fixed displacement, positive displacement pumps. A first of the two fixed displacement, positive displacement pumps is a main fuel pump 102 between a system fuel inlet 104 and a system fuel outlet 106. The system 100 includes a fuel flow path 108 at least partially defined between the main fuel pump 102 and the system fuel outlet 106. The system 100 includes a support fuel pump 110 between the system fuel inlet 104 and the system fuel outlet 106. The main fuel pump 102 is sized to provide just enough flow to satisfy a critical design point (typically cruise) and a second larger pump (the support fuel pump) that can be selected to provide flow on-demand for large transient or short-term high-power conditions. By using two differently sized pumps that can be selected to provide on-demand fuel flow, the pump power draw at a critical condition (e.g., cruise) is reduced, because the main fuel pump 102 is right sized for that condition and the support fuel pump 110 is put into a minimum (idle) power condition. System 100 is also more efficient (in terms of horsepower extraction at cruise/design point and reduction in heat added to fuel from pumping) than traditional single positive displacement pump systems where the single pump is sized to provide combined flow of the two fixed displacement pumps. Although, this may come at an increase in cost and weight and reduction in reliability, these negative characteristics can be outweighed depending on engine trade factors.

With continued reference to FIGS. 1-2, when in an active state, support fuel pump 110 is sized to provide more flow to the system fuel outlet 106 than the main fuel pump 102. The system 100 includes a valve assembly 101 in fluid communication with the support fuel pump 110 configured and adapted to connect the support fuel pump 110 to the system fuel outlet 106. The valve assembly 101 includes a pressure bypass valve (PBV 112) in fluid communication with the fuel flow path 108, between the support fuel pump 110 and the system fuel outlet 106. The valve assembly 101 includes a solenoid valve 120 in fluid communication with the PBV 112. The PBV 112 is configured and adapted to translate between a closed position (shown in FIG. 1) and an open position (shown in FIG. 2). In the open position, fluid flow is permitted to flow through an inlet 130 of the PBV to an outlet 132 of the PBV between the support fuel pump 110 and the system fuel outlet 106. In the closed position, fluid flow is not permitted from inlet 130 to outlet 132, thereby rendering the support fuel pump 110 in an idle state.

With continued reference to FIGS. 1 and 2, support fuel pump 110 is placed in an idle state (typically during cruise) by a pump bypass valve (PBV 112). This state is shown in FIG. 1. In FIG. 1, line 115 and a right hand pressure inlet 137 of the PBV 112 have the same pressure as idle pressure 139 at high pressure inlet 138 of the PBV 112 such that a flow path between inlet 130 and outlet 132 is closed. A pressure differential (dP) between a low pressure (indicated schematically by the thinner lines) and a high pressure (HP) (indicated schematically by the thicker lines) is set by system resistances and/or an orifice 117 to minimize high pressure when idled. As shown in FIG. 2, the support fuel pump 110 is commanded on via a command by solenoid 120 to provide the low unit inlet pressure to line 115 (now shown as a thinner line than FIG. 1) and a right hand pressure inlet 137 of the PBV 112 such that a support pump idle pressure 139 at high pressure inlet 138 of the PBV 112 shifts the valve spool of the PBV to the right (as oriented in FIG. 2) and opens the PBV 112 so that the support fuel pump 110 can provide fuel flow to the fuel flow path 108 and supplement that provided by the main fuel pump 102.

With continued reference to FIGS. 1-2, the system 100 includes a pressure regulating valve (PRV) 116 in fluid communication with the fuel flow path 108 between the main fuel pump 102 and the system fuel outlet 106. The PRV 116 is positioned between a downstream side 136 and an upstream side 134 of the support fuel pump 110. The system 100 includes electro-hydraulic servo valve (EHSV) 118 in fluid communication with the fuel flow path 108 between the PRV 116 and the system fuel outlet 106.

Figure 3:
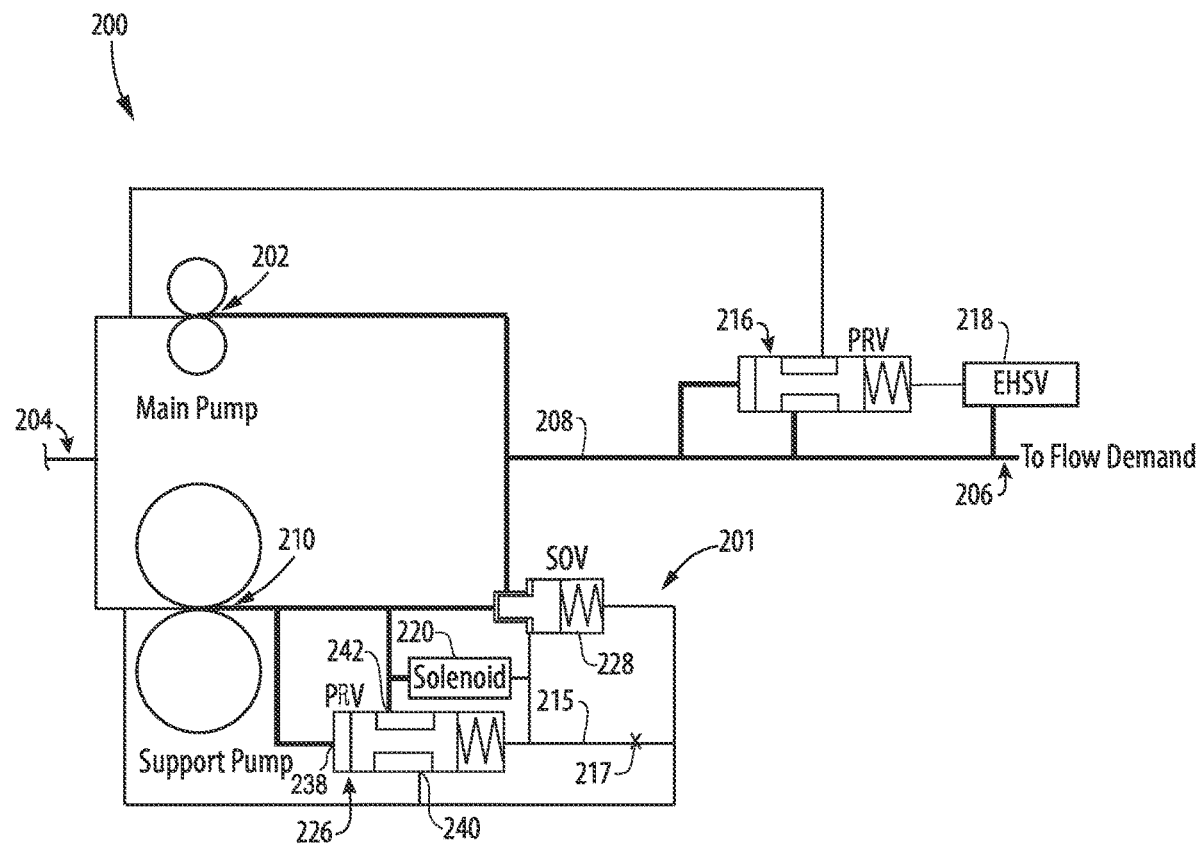
FIG. 3 is a schematic depiction of a fuel pump system constructed in accordance with another embodiment of the present disclosure, showing the SOV in a closed position.
Figure 4:
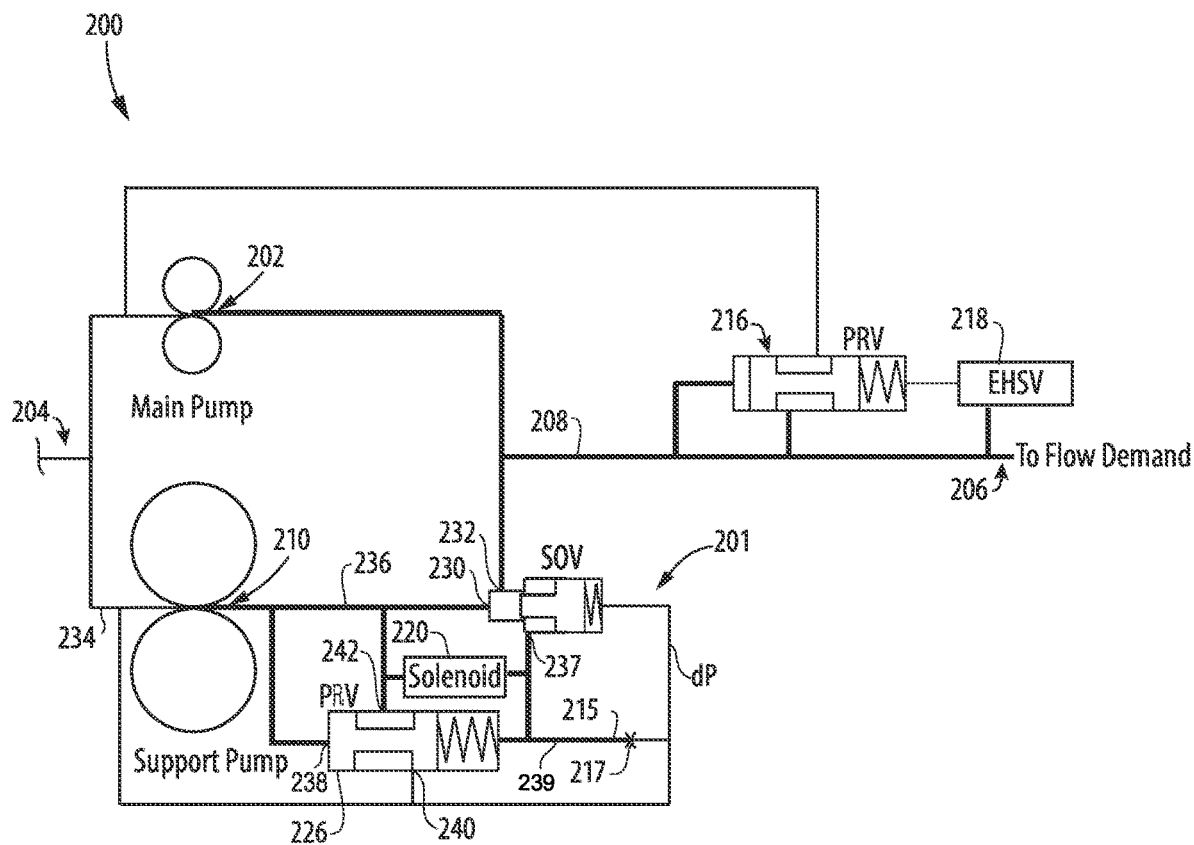
FIG. 4 is a schematic depiction of the system of FIG. 3, showing the SOV in an open position.

As shown in FIGS. 3-4, another embodiment of a fuel pump system 200 is shown. System 200 similar to system 100 except that a valve assembly 201 system 200 includes a second PRV 226 in fluid communication with a support fuel pump 210 and a shut-off valve (SOV) 228, instead of PBV 112. Additionally, valve assembly 201 includes a solenoid valve 220 in fluid communication with the downstream side 236 of the support fuel pump 210 and the upstream side 234 of the support fuel pump 210. Support fuel pump 210 is placed in an idle state (typically during cruise) by a shut off valve (SOV) 228. This idle state is shown in FIG. 3. In FIG. 3, fuel line 215 has a lower pressure than idle pressure at high pressure inlet 238 of the PBV 112 such that a flow path between inlet 240 and outlet 242 is open. The PRV sets a fixed low differential pressure (dP) between a low pressure (a unit inlet pressure, indicated schematically by the thinner lines) and a high pressure (HP) (a pump idle pressure, indicated schematically by the thicker lines) to minimize HP when idled.

With continued to FIGS. 3-4, support pump 210 is placed in an idle state by solenoid 220 which controls SOV 228 and PRV 226. The solenoid 220 is switched to close the PRV 226 and open the SOV 228 so that the secondary pump 210 can assist the primary 202. The support fuel pump 210 is commanded on via a command by solenoid 220 that provides a support pump idle pressure 239 (indicated schematically by thicker lines) to an inlet 237 of the SOV 228. With the higher support pump idle pressure 239 at inlet 237, valve spool of the SOV 228 is driven to the right (as oriented in FIG. 4). The support pump idle pressure 239 from solenoid 220 drives the spool of the PRV 226 to the left closing the flow path from PRV inlet 240 to PRV outlet 242.

With continued to FIGS. 3-4, SOV 228 is in fluid communication with the support fuel pump 210 between the support fuel pump 210 and the system fuel outlet 206. The SOV 228 is configured and adapted to translate between and open position and a closed position. In the open position, shown in FIG. 3, fluid flow is permitted between the support fuel pump 210 and the system fuel outlet 206. The main fuel pump 202 and the support fuel pump 210 are fixed displacement, positive displacement pumps Similar to system 100, the system 200 includes a pressure regulating valve (PRV) 216 in fluid communication with the fuel flow path 208 between the main fuel pump 202 and the system fuel outlet 206. The system 200 includes electro-hydraulic servo valve (EHSV) 218 similar to EHSV 118.

Figure 5:
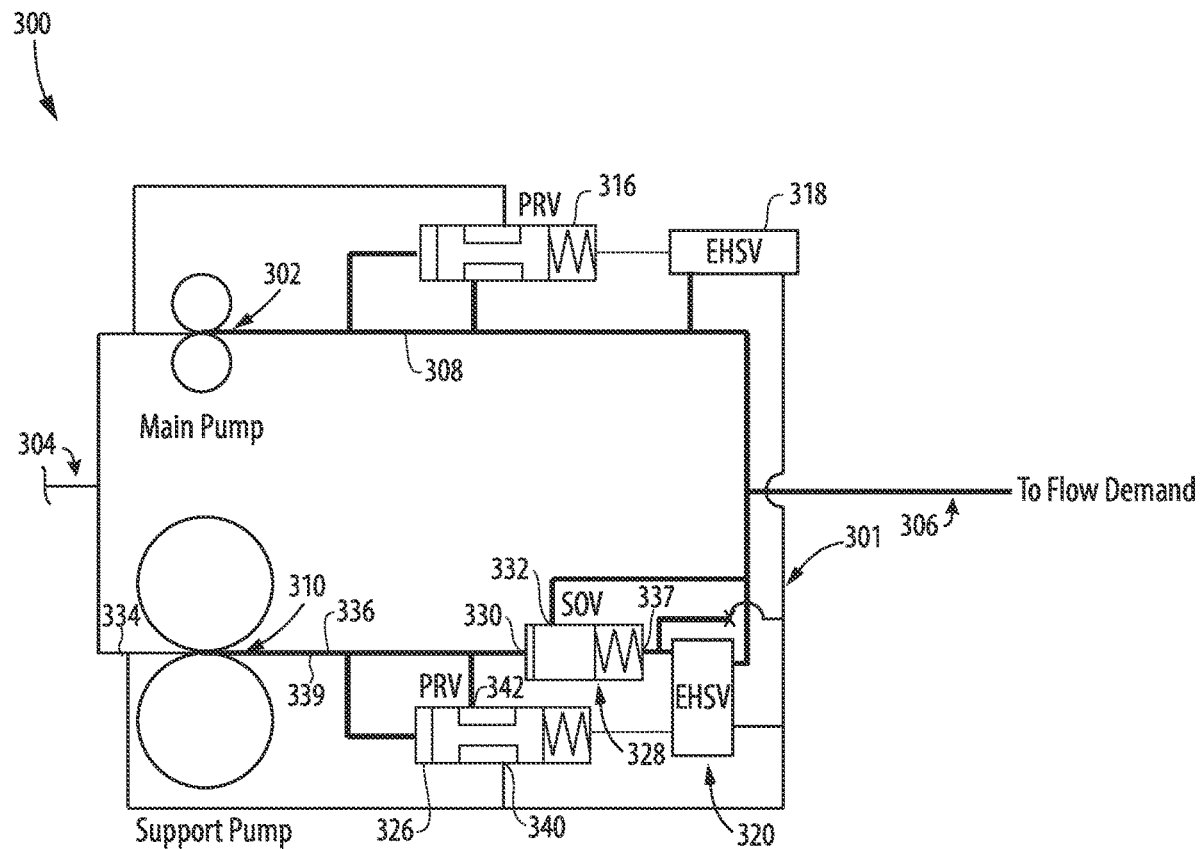
FIG. 5 is a schematic depiction of a fuel pump system constructed in accordance with another embodiment of the present disclosure, showing the SOV in a closed position.
Figure 6:
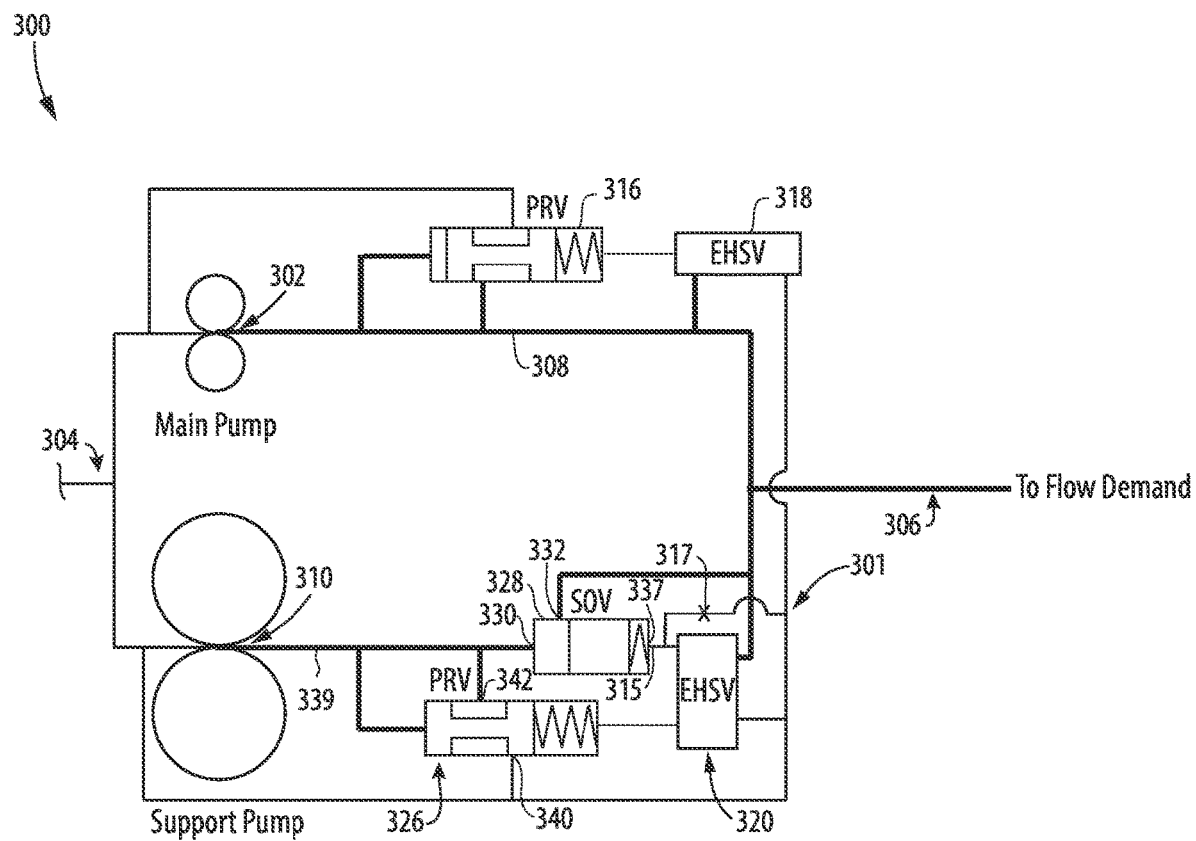
FIG. 6 is a schematic depiction of the system of FIG. 3, showing the SOV in an open position.

As shown in FIGS. 5-6, similar to system 100, the system 300 includes a pressure regulating valve (PRV) 316 in fluid communication with the fuel flow path 308 between a main fuel pump 302 and a system fuel outlet 306. The system 300 includes electro-hydraulic servo valve (EHSV) 318 similar to EHSV 118. Fuel pump system 300 is similar to system 200 except that instead of a solenoid control, e.g., solenoid 120 or 220, pump 310 is placed in an idle state by a uni-polar EHSV 320 which controls a SOV 328. The EHSV 320 is fluid communication with a support fuel pump 310 between the support fuel pump 310 and a fuel pump system fuel outlet 306. System 300 includes a main fuel pump 302 between a system fuel inlet 304 and a system fuel outlet 306. The system 300 includes a fuel flow path 308 at least partially defined between the main fuel pump 302 and the system fuel outlet 306. The advantages associated with using two differently sized pumps described above, readily apply to system 300. Shut-off valve 328 is in fluid communication with the support fuel pump 310 between the support fuel pump 310 and the system fuel outlet 306.

With continued reference to FIGS. 5-6, SOV 328 is configured and adapted to translate between and closed position (in FIG. 5) and an open position (in FIG. 6). In the open position, fluid flow is permitted between the support fuel pump 310 and the system fuel outlet 306. In the open position, fluid flow is permitted to flow through an inlet 330 of the SOV 328 to an outlet 332 of the SOV 328 between the support fuel pump 310 and the system fuel outlet 306. The PRV 326 is positioned between a downstream side 336 and an upstream side 334 of the support fuel pump 310. In the closed position, fluid flow is not permitted from inlet 330 to outlet 332 of SOV 328, thereby rendering the support fuel pump 310 in an idle state.

With continued reference to FIGS. 5-6, support fuel pump 310 is placed in an idle state (typically during cruise) by a shut off valve 328. This state is shown in FIG. 5. A pressure differential (dP) between a low pressure (a unit inlet pressure, indicated schematically by the thinner lines) and a high pressure (HP) (pump idle pressure, indicated schematically by the thicker lines) is set by system resistances and/or an orifice 317 to minimize high pressure when idled. The support fuel pump 310 is commanded on via a command by EHSV 320 that provides the unit inlet low pressure in line 315 to an inlet 337 of the SOV 328. With low unit inlet pressure at inlet 337, a support pump idle pressure 339 drives the valve spool of the SOV 328 to the right (as oriented in FIG. 6). In FIG. 6, EHSV 320 drives the spool of the PRV 326 to the left closing the flow path from PRV inlet 340 and PRV outlet 342. The PRV 326 sets a dP that is controlled by the PRV 326 to minimize HP throughout the idling envelope, similar to system 200 described above. The EHSV 320 is depowered/set to a low current to close the PRV 326 (shown in FIG. 6) and the EHSVs 5th control port sends low pressure to open the SOV 328 so that the support fuel pump 310 can assist the primary 302.

A method for controlling a dual fuel pump system, e.g. system 100, 200 or 300, includes pumping fuel from a system fuel inlet, e.g. system fuel inlet 104, 204, 304, to a system fuel outlet, e.g., 106, 206, or 306, with a main fuel pump, e.g. main fuel pump 102, 202 or 302. The method includes opening at least one of a valve assembly, e.g. valve assembly 101, 201, or 301, with at least one of a solenoid, e.g. solenoid 120 or 220, or an EHSV, e.g. EHSV 320. The method includes pumping fuel from the system fuel inlet to the system fuel outlet with a support fuel pump, e.g. support fuel pump 110, 210, or 310. The support fuel pump is sized to provide more flow to the system fuel outlet than the main fuel pump. The method includes switching a solenoid, e.g. the solenoid 120, to a closed position to close the PBV, e.g. the PBV 112, to place the support fuel pump in an idle state. The method includes switching a solenoid, e.g. a solenoid 220, to a closed position to open an SOV, and to close a PRV, e.g. the PRV 226, to place the support fuel pump in an idle state. The method includes switching an EHSV, e.g. an EHSV 320, to a closed position to open an SOV, e.g. the SOV 328, and to close a PRV, e.g. the PRV 326, to place the support fuel pump in an idle state.

The methods and systems of the present disclosure, as described above and shown in the drawings, provide for solenoid driven actuator system, with superior properties including increased efficiency (in terms of horsepower extraction at cruise and reduction in heat added to fuel from pumping) than traditional single positive displacement pump systems. The systems and methods of the present invention can apply to a variety of dual fuel pump systems, or the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel pump system comprising:
   a main fuel pump between a system fuel inlet and a system fuel outlet;
   a main fuel flow path defined between the main fuel pump and the system fuel outlet;
   a support fuel pump between the system fuel inlet and the system fuel outlet;
   a pressure regulating valve (PRV) comprising:
      a PRV inlet in fluid communication with the main fuel flow path;
      a PRV outlet in fluid communication with the system fuel inlet;
      a PRV first control chamber on a side of a PRV spool and in fluid communication with the main fuel flow path and upstream of the PRV inlet; and
      a PRV second control chamber on an opposite side of the PRV spool from the PRV first control chamber;
   an electro-hydraulic servo valve (EHSV) comprising:
      a first port in fluid communication with the system fuel inlet;
      a second port in fluid communication with the system fuel outlet; and
      a control port in fluid communication with the PRV second control chamber;
   a valve assembly in fluid communication with the support fuel pump fluidically connecting the support fuel pump to the system fuel outlet and comprising:
      a pressure bypass valve (PBV) comprising:
         a PBV inlet in fluid communication with the support fuel pump;
         a PBV outlet in fluid communication with the PBV inlet and the PRV inlet, and downstream of the PRV first control chamber;
         a first PBV control chamber on a side of a PBV spool and in fluid communication with the support fuel pump, and
         a second PBV control chamber in fluid communication with the system inlet and on an opposite side of the PBV spool from the first PBV control chamber.

2. The fuel pump system as recited in claim 1, wherein the support fuel pump has a higher output flow capacity than the main fuel pump.

3. The fuel pump system as recited in claim 1, wherein the PBV is configured and adapted to translate between an open position and a closed position, wherein in the open position, fluid flow is permitted between the PBV inlet and the PBV outlet.

4. The fuel pump system as recited in claim 1, wherein the valve assembly includes a second PRV in fluid communication with the support fuel pump.

5. The fuel pump system as recited in claim 4, wherein the PRV is positioned between an upstream side and a downstream side of the support fuel pump.

6. The fuel pump system as recited in claim 1, wherein the valve assembly includes a second EHSV in fluid communication with the support fuel pump between the support fuel pump and the system fuel outlet.

7. The system as recited in claim 1, wherein the valve assembly includes a shut-off valve (SOV) in fluid communication with the support fuel pump between the support fuel pump and the system fuel outlet.

8. The fuel pump system as recited in claim 7, wherein the SOV is configured and adapted to translate between an open position and a closed position, wherein in the open position, fluid flow is permitted between the support fuel pump and the system fuel outlet.

9. The fuel pump system as recited in claim 1, wherein the main fuel pump and the support fuel pump are fixed displacement, positive displacement pumps.

10. A method for controlling a dual fuel pump system comprising:
   pumping fuel by a main fuel pump from a system fuel inlet through a main fuel flow path to a system fuel outlet;
   pumping fuel by a support fuel pump from the system fuel inlet into a support fuel path;
   exerting a first pressure on a first pressure bypass valve (PBV) control chamber of the PBV that is fluidically connected to the main fuel flow path;
   exerting a second pressure on a second PBV control chamber of the PBV that is fluidically connected to the support fuel path;
   actuating a solenoid fluidically connecting the main fuel flow path and the second PBV control chamber and thereby exerting the second pressure on the second PBV control chamber; and
   reacting to a sum of forces on the PBV and either connecting fuel flow in the support fuel path to the system fuel inlet or directing the fuel flow in the support fuel path to the main fuel flow path.

11. The method as recited in claim 10, and further comprising modulating a fuel output rate of the main fuel flow path by controlling an electrohydraulic servo valve (EHSV) that actuates a pressure regulating valve (PRV) to direct a portion of fuel flow in the main fuel flow path to the system fuel inlet.

12. The method as recited in claim 11, and further comprising:
   exerting a third pressure on a first PRV control chamber of the PRV that is fluidically connected to the main fuel flow path; and
   exerting a fourth pressure on a second PRV control chamber of the PRV that is fluidically connected to the EHSV.

13. The method as recited in claim 12, and further comprising reacting to a sum of forces on the PRV and accordingly directing a proportion of the fuel flow in the main fuel flow path to the system fuel inlet.

14. A fuel pump system comprising:
   a main fuel pump fluidically between a system fuel inlet and a system fuel outlet;
   a main fuel flow path fluidically between an outlet of the main fuel pump and the system fuel outlet;
   a support fuel pump fluidically between the system fuel inlet and the system fuel outlet;
   a pressure regulating valve (PRV) comprising:
      a PRV inlet in fluid communication with the main fuel flow path;
      a PRV outlet in fluid communication with the system fuel inlet;
   a valve assembly in fluid communication with an outlet of the support fuel pump and fluidically connecting the outlet of the support fuel pump to the system fuel outlet, wherein the valve assembly comprises:
      a pressure bypass valve (PBV) comprising:
         a PBV inlet in fluid communication with the outlet of the support fuel pump;
         a PBV outlet in fluid communication with the PBV inlet and the PRV inlet;
         a first PBV control chamber on a side of a PBV spool and in fluid communication with the outlet of the support fuel pump; and
         a second PBV control chamber in fluid communication with the system inlet and on an opposite side of the PBV spool from the first PBV control chamber; and
   a solenoid inlet in fluid communication with the main fuel flow path; and
   a solenoid outlet in fluid communication with the second PBV control chamber and in fluid communication with the system fuel inlet.

15. The fuel pump system of claim 14, wherein an orifice fluidically connects the solenoid outlet and the second PBV control chamber to the system fuel inlet.

16. The fuel pump system of claim 14, wherein the solenoid inlet is downstream of the PRV inlet.

17. The fuel pump system of claim 14, wherein the PBV further comprises:
   a second PBV outlet in fluid communication with the PBV inlet, and wherein a second orifice fluidically connects the second PBV outlet to the system fuel inlet.

18. The fuel pump system of claim 2, and further comprising a solenoid, the solenoid comprising:
   a solenoid inlet in fluid communication with the main fuel flow path; and
   a solenoid outlet in fluid communication with the second PBV control chamber and in fluid communication with the system fuel inlet.

19. The fuel pump system of claim 2, wherein an orifice fluidically connects the solenoid outlet and the second PBV control chamber to the system fuel inlet.

20. The fuel pump system of claim 2, wherein the solenoid inlet is downstream of the PRV inlet.

* * * * *